US009664282B2

(12) United States Patent
Duggal et al.

(10) Patent No.: US 9,664,282 B2
(45) Date of Patent: May 30, 2017

(54) POLYURETHANE ELASTOMERIC SEAL FOR HYDRAULIC PUMPS

(71) Applicant: Dow Global Technologies LLC, Midland, MI (US)

(72) Inventors: Rajat Duggal, Pearland, TX (US); Subodh P. Jagtap, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/897,720

(22) PCT Filed: Aug. 14, 2014

(86) PCT No.: PCT/US2014/050995
§ 371 (c)(1),
(2) Date: Dec. 11, 2015

(87) PCT Pub. No.: WO2015/026613
PCT Pub. Date: Feb. 26, 2015

(65) Prior Publication Data
US 2016/0153559 A1 Jun. 2, 2016

Related U.S. Application Data

(60) Provisional application No. 61/867,672, filed on Aug. 20, 2013.

(51) Int. Cl.
| | |
|---|---|
| *F16J 9/26* | (2006.01) |
| *C08G 18/76* | (2006.01) |
| *C08G 18/10* | (2006.01) |
| *C08G 18/32* | (2006.01) |
| *C08G 18/44* | (2006.01) |
| *F04B 53/14* | (2006.01) |
| *F04B 53/02* | (2006.01) |
| *B29C 35/00* | (2006.01) |
| *C08G 18/70* | (2006.01) |
| *C09K 3/10* | (2006.01) |
| *F16J 9/12* | (2006.01) |
| *F16J 9/28* | (2006.01) |
| *B29K 69/00* | (2006.01) |

(52) U.S. Cl.
CPC ............... *F16J 9/26* (2013.01); *B29C 35/00* (2013.01); *C08G 18/10* (2013.01); *C08G 18/324* (2013.01); *C08G 18/3206* (2013.01); *C08G 18/44* (2013.01); *C08G 18/708* (2013.01); *C08G 18/7671* (2013.01); *C09K 3/1021* (2013.01); *F04B 53/02* (2013.01); *F04B 53/14* (2013.01); *F04B 53/143* (2013.01); *F16J 9/12* (2013.01); *F16J 9/28* (2013.01); *B29K 2069/00* (2013.01); *C08G 2190/00* (2013.01)

(58) Field of Classification Search
CPC ........ C08G 18/6637; C08G 18/44; F16J 9/26; F16J 9/00; F04B 53/143
USPC .......................................................... 525/459
See application file for complete search history.

(56) References Cited

U.S. PATENT DOCUMENTS

| | | | | |
|---|---|---|---|---|
| 4,024,113 A | * | 5/1977 | Ammons | .......... B32B 17/10018 428/425.6 |
| 4,160,853 A | * | 7/1979 | Ammons | ............ B32B 17/1077 428/215 |
| 4,423,205 A | * | 12/1983 | Rajan | ..................... C08G 64/30 528/371 |
| 4,456,745 A | * | 6/1984 | Rajan | ..................... C08G 64/30 528/371 |
| 5,274,074 A | * | 12/1993 | Tang | ....................... A61L 15/64 442/301 |
| 5,960,700 A | | 10/1999 | Staggs et al. | |
| 8,312,805 B1 | | 11/2012 | Blume | |
| 2004/0259970 A1 | * | 12/2004 | Lockhart | ............ C08G 18/0823 522/84 |
| 2005/0003102 A1 | * | 1/2005 | Lockhart | ............ C08G 18/0823 427/558 |
| 2008/0064844 A1 | | 3/2008 | Nagaraj et al. | |
| 2008/0174110 A1 | * | 7/2008 | Olson | ..................... B29C 63/34 285/55 |
| 2011/0253372 A1 | * | 10/2011 | Crandall | .............. C08G 18/348 166/302 |
| 2012/0141308 A1 | | 6/2012 | Saini et al. | |

FOREIGN PATENT DOCUMENTS

| | | |
|---|---|---|
| CN | 202327074 U | 7/2012 |
| CN | 202441583 U | 9/2012 |
| CN | 202520937 U | 11/2012 |
| WO | 2008/091511 A2 | 7/2008 |

OTHER PUBLICATIONS

PCT/US2014/050995, International Search Report & Written Opinion, Mail Date Nov. 5, 2014, pp. 1-8.
PCT/US2014/050995, International Preliminary Report on Patentability, Mail Date Feb. 23, 2016, pp. 1-6.

* cited by examiner

*Primary Examiner* — Mike M Dollinger

(57) ABSTRACT

A method for forming a piston seal of a hydraulic pump includes forming a reaction mixture that includes a prepolymer component, a polyol additive, a diol component, and a curative component, forming a sealing element with the reaction mixture and a mold, and curing the sealing element to form a piston seal of a hydraulic pump. The prepolymer component includes a polycarbonate-isocyanate prepolymer that is a reaction product of at least an isocyanate component and a polycarbonate polyol component.

10 Claims, No Drawings

POLYURETHANE ELASTOMERIC SEAL FOR HYDRAULIC PUMPS

FIELD

Embodiments relate to a polyurethane elastomeric seal for hydraulic pumps that is formed using a polycarbonate-isocyanate prepolymer, and to a method of forming the polyurethane elastomeric seal.

INTRODUCTION

Hydraulic pumps may include various mechanical components, e.g., at least one piston moving in a reciprocating manner in conjunction with a piston rod. As discussed in U.S. Pat. No. 8,312,805, the piston may have an elastomeric seal material that is a polyurethane product, which seal material is incorporated into a space between the piston and a liner sleeve wall that surrounds the piston. Operating conditions (such as elevated temperature and/or elevated pressure) of the hydraulic pumps and the abrasive materials being moved by the hydraulic pumps may cause premature failure of the piston seal. Therefore, polyurethane seals that are better able to withstand the industrial conditions of hydraulic pumps are sought.

Further, hydraulic pumps such as concrete pumps need to be able to effectively move material that is abrasive, heavy, and highly viscous. The use of poly(tetra methylene)ether glycol (PTMEG) based polyurethane elastomers to provide abrasion resistance in transferring pipes connected to a concrete pump is discussed in Publication No. WO 2008/091511. However, polyurethane elastomers that are adapted to provide both abrasion resistance and withstand the high temperatures within a hydraulic pump such as the concrete pump are sought.

SUMMARY

Embodiments may be realized by providing a method for forming a piston seal of a hydraulic pump that includes forming a reaction mixture that includes a prepolymer component, a polyol additive, a diol component, and a curative component, forming a sealing element with the reaction mixture and a mold, and curing the sealing element to form a piston seal of a hydraulic pump. The prepolymer component includes a polycarbonate-isocyanate prepolymer that is a reaction product of at least an isocyanate component and a polycarbonate polyol component, and the prepolymer component is present in an amount from 55 wt % to 90 wt %, based on a total weight of the reaction mixture. The polyol additive includes a polycarbonate polyol, which is present in an amount from 5 wt % to 40 wt %, based on the total weight of the reaction mixture, the diol component is present in an amount from 5 wt % to 20 wt %, based on the total weight of the reaction mixture, and the curative component includes a diamine based curative agent that is present in an amount from 0.01 wt % to 20 wt %, based on the total weight of the reaction mixture.

DETAILED DESCRIPTION

Embodiments relate to a method of forming a polyurethane elastomeric seal that includes allowing a reaction to occur between a urethane based prepolymer component, a polyol additive, a diol chain extender component, and a curative component. The urethane based prepolymer component includes a polycarbonate-isocyanate prepolymer that is formed from a reaction between an isocyanate component and a polycarbonate polyol component. Further, embodiments relate to a low friction piston seal that has improved abrasion resistance and has an improved ability to withstand the operating conditions of a hydraulic pump. The polyurethane elastomeric seal may be formulated to have a Shore A hardness of greater than 85 (e.g., from 85 to 100, from 90 to 100, etc.), according to ASTM D 2240, even after being exposed to hydrolytic aging for 28 days.

The polyurethane elastomeric seal may be a piston seal in piston including pumps. For example, the polyurethane elastomeric seal may be used in a hydraulic pump such as a concrete pump and a mud pump. The polyurethane elastomeric seal may be formed by a casting process such as a cold-chamber casting process or a hot-chamber casting process. For example, the polyurethane elastomeric seal may form a seal section that is cast-in-place on a piston of the hydraulic pump using a reaction mixture and a mold, and then cured in direct contact with an outer wall of the piston. According to another exemplary embodiment, the polyurethane elastomeric seal may be formed in the mold using the reaction mixture, removed from the mold, and then attached to the piston of the hydraulic pump. The reaction mixture includes the urethane based prepolymer component having a polycarbonate-isocyanate prepolymer, a polyol additive, a diol chain extender component, and a curative component, and the reaction mixture may be formed in or poured into the mold.

The method for forming the polyurethane elastomeric seal includes forming the reaction mixture, which includes a urethane prepolymer component having at least a polycarbonate-isocyanate prepolymer, a polyol additive, a curative component having at least a diamine based curative agent, and a diol component, in a mold to form a sealing layer. The polycarbonate-isocyanate prepolymer is a reaction product of an isocyanate component and a polycarbonate polyol, and the prepolymer component is present in the reaction mixture in an amount from 55 wt % to 90 wt % (e.g., 60 wt % to 85 wt %, 65 wt % to 80 wt %, 70 wt % to 80 wt %, etc.), based on a total weight of the reaction mixture. As would be understood by a person of ordinary skill in the art, the weight percentages are calculated on a basis of 100 wt % for the total weight of the reaction mixture. The prepolymers in the urethane based prepolymer component may each include at least one terminal isocyanate group, and the curative component may include at least one curative agent having an active hydrogen group.

The urethane prepolymer component includes at least one urethane based prepolymer. The urethane based prepolymer is a product of a prepolymer forming reaction mixture that includes an isocyanate component and a polyol component. The isocyanate component includes one or more different isocyanates (e.g., at least two different isomers of one aromatic isocyanate). Each of the one or more different isocyanates in the isocyanate component may have a functionality from 1.8 to 4.2 (e.g., from 1.9 to 3.5, from 2.0 to 3.3, etc.). The one or more isocyanates may be independently selected from the group of an aromatic isocyanate, a cycloaliphatic isocyanate, and an aliphatic isocyanate. The urethane prepolymers may have an isocyanate group content (i.e., NCO content) by weight from 5% to 30% (e.g., 5% to 20%, 8% to 15%, 9% to 11%, etc.). The polyol component includes one or more different polyols. The one or more different polyols may each be one of a polyether or a polyester.

When reacting the isocyanate component with the polyol component, the isocyanate index may be from 90 to 115

(e.g., 95 to 110, 100 to 105, etc.). The isocyanate index is the equivalents of isocyanate groups (i.e., NCO moieties) present, divided by the total equivalents of isocyanate-reactive hydrogen containing groups (i.e., OH moieties) present, multiplied by 100. Considered in another way, the isocyanate index is the ratio of the isocyanate groups over the isocyanate reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

According to embodiments, the urethane prepolymer component includes a polycarbonate-isocyanate prepolymer that is formed using a prepolymer forming reaction mixture. For forming the polycarbonate-isocyanate prepolymer, the isocyanate component accounts for 20 wt % to 60 wt % (e.g., 25 wt % to 50 wt %, 30 wt % to 45 wt %, 35 wt % to 40 wt %, etc.) of a total weight of the prepolymer forming reaction mixture. The polyol component accounts for 30 wt % to 80 wt % (e.g., 45 wt % to 75 wt %, 50 wt % to 70 wt %, 55 wt % to 65 wt %, 60 wt % to 65 wt %, etc.) of the total weight of the prepolymer forming reaction mixture. The prepolymer forming reaction mixture may also include an additive component that includes a catalyst that is formulated to initiate, further, and/or accelerate the reaction between the isocyanate component and the polyol component. For example, the catalyst may include at least one such catalyst that is known in the art. The additive component may also include other additives selected from the group of a bromoacetic ester, a trichloroacetic acid, a cyanoacetic ester, a dimethyl sulfate, a benzoyl chloride, and an acetyl chloride. The additive component accounts for less than 5 wt % (e.g., from 0.01 wt % to 0.05 wt %, 0.15 wt % to 0.1 wt %, etc.) of the total weight of the prepolymer forming reaction mixture.

Exemplary isocyanates of the one or more isocyanates in the isocyanate component of the prepolymer forming reaction mixture include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'- and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE.

According to an exemplary embodiment, the isocyanate component in the prepolymer forming reaction mixture may include an aromatic diisocyanate mixture that includes at least two different aromatic diisocyanates, e.g., a mixture of different isomers of MDI or TDI, or a mixture of MDI and TDI. According to exemplary embodiments, the aromatic diisocyanate mixture may include at least 60 wt % of 4,4'-methylene diphenyl isocyanate and a remainder of at least one selected from the group of an isomer of TDI and one isomer of MDI that is different from 4,4'-methylene diphenyl isocyanate (e.g., in mixture ratios of 60 wt % and 40 wt %, 70 wt % and 30 wt %, 80 wt % and 20 wt %, 90 wt % and 10 wt %, 95 wt % and 5 wt %, 98 wt % and 2 wt %, etc.), based on a total weight of the isocyanate component. For example, the aromatic diisocyanate mixture may include at least 60 wt % of 4,4'-methylene diphenyl isocyanate and a remainder of 2,4'-methylene diphenyl isocyanate, based on the total weight of the isocyanate component.

The polyol component for forming the polycarbonate-isocyanate prepolymer includes at least one polycarbonate polyol, e.g., includes one polycarbonate diol, one or more different polycarbonate diols, or one polycarbonate diol and one or more other polyols. Other polyols that may be included in the polyol component include, e.g., a polyether polyol, a polyester polyol, an ester-carbonate polyol, and an ether-carbonate polyol. Each polyol in the polyol component may have a nominal hydroxyl functionality from 2 to 8 (e.g., 2 to 4). According to an exemplary embodiment, the reaction mixture for forming the prepolymer includes from 30 wt % to 80 wt % (e.g., 40 wt % to 70 wt %, 30 wt % to 60 wt %, 50 wt % to 80 wt %, etc.), of a polycarbonate diol, based on the total weight of the prepolymer forming reaction mixture. For example, the prepolymer forming reaction mixture includes 30 wt % to 45 wt % of the isocyanate component, and 55 wt % to 70 wt % of a polycarbonate diol that forms the polyol component, based on the total weight of the prepolymer forming reaction mixture.

The polycarbonate polyol may be a product of a reaction between at least one diol (e.g., that includes at least one alkanediol) and a carbonyl moiety containing component (e.g., that includes at least one such moiety selected from the group of a carbonate ester and phosgene). Exemplary diols that may be used to form the polycarbonate polyol include 1,3-propanediol, 1,4-butanediol, 1,5-pentanediol, 1,6-hexandiol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl)ether, short-chain C2, C3, or C4 polyether diols having a number average molecular weight of less than 700 g/mol, combinations thereof, and isomers thereof. Exemplary carbonate esters include dimethyl carbonate, trimethylene carbonate, ethylene carbonate, diphenyl carbonate, propylene carbonate, poly(propylene carbonate), and poly(bisphenol A carbonate). The polycarbonate polyol may be obtained by subjecting a reaction mixture including the diol and the carbonyl moiety containing component to a polymerization reaction. For example, the resultant polycarbonate polyol may be a hydroxyl terminated polycarbonate diol.

The polycarbonate polyol may include repeating units from one or more alkane diols having from 2 to 50 carbon atoms (e.g., 2 to 20 carbon atoms, 3 to 6 carbon atoms, 5 to 6 carbon atoms, etc.) as a branched or unbranched chain, which may also be interrupted by additional heteroatoms such as oxygen (O). Exemplary polycarbonate polyols having repeating units from one or more alkane diol components are available from UBE Industries under the trade name ETERNACOLL, and from Bayer MaterialScience, LLC, under the trade name DESMOPHEN. For example, the polycarbonate polyol is one selected from the group of a 1,6-hexanediol based polycarbonate diol, a 1,5-pentanediol based polycarbonate diol, a 1,4-butanediol based polycarbonate diol, and a 1,3-propanediol based polycarbonate diol. According to an exemplary embodiment, the polycarbonate polyol is a reaction product of 1,6-hexanediol and a carbonate ester such as 1,4-cyclohexanedimethanol.

The polycarbonate polyol may have a number average molecular weight from 750 to 5000 g/mol (e.g., 1000 to 5000 g/mol, 1500 to 3000 g/mol, 1800 to 2200 g/mol, etc.). The polycarbonate polyol may have a nominal hydroxyl number from 22 to 220 mg KOH/g (e.g., 35 to 150 mg KOH/g, 45 to 75 mg KOH/g, 50 to 60 mg KOH/g, etc.). The polycarbonate polyol may have an average viscosity from 300 to 15,000 cp as measured at 75° C. by parallel plate rheometry. For example, the polycarbonate polyol may be moderately viscous with a viscosity from 1500 cp to 5000 cp measured at 75° C. (e.g., 2000 cp to 3000 cp, etc.).

The polymerization reaction for forming the polycarbonate polyol may be aided by the presence of a catalyst component. A method for performing the polymerization reaction to form the polycarbonate polyol in the presence of the catalyst component includes, e.g., a transesterification reaction. In a transesterification reaction, reactants are contacted in the presence of a transesterification catalyst and under reaction conditions. A catalyst component that includes at least one selected from the group of a homogeneous catalyst and a heterogeneous catalyst may be used. The catalyst used in the polymerization reaction for the polycarbonate polyol may include at least one selected from the group of a hydroxide, an oxide, a metal alcoholate, a carbonate, and an organometallic compound of metal of one of a main group I, II, III and IV of the periodic table of the elements, a subgroup III and IV, and an element from the rare earth group (e.g., compounds of Ti, Zr, Pb, Sn, and Sb, are particularly suitable for the processes described herein). After the reaction is complete, the catalyst may be left in the resultant product, or may be separated, neutralized, or masked.

Temperatures for the transesterification reaction may be between 120° C. and 240° C. The transesterification reaction may be performed at atmospheric pressure; however, it is also possible to form the transesterification reaction at lower or higher pressures. Vacuum may be applied at the end of the activation cycle to remove any volatiles. Reaction time depends on variables such as temperature, pressure, and the type and amount of catalyst used.

The prepolymer component for forming the polyurethane elastomeric seal may optionally include at least one other prepolymer that is different from the polycarbonate prepolymer. According to an exemplary embodiment, the prepolymer component includes 50 wt % to 99 wt % (e.g., 60 wt % to 90 wt %, 75 wt % to 85 wt %, etc.) of the polycarbonate prepolymer, based on a total weight of the prepolymer component, and a remainder of the at least one other prepolymer such as a polyether glycol derived prepolymer (e.g., a PTMEG derived prepolymer). A total weight of the other prepolymer in the polyol component may be from 1 wt % to 50 wt % (e.g., 5 wt % to 35 wt %, 10 wt % to 30 wt %, 15 wt % to 25 wt %, etc), based on the total weight of the prepolymer component. For example, the prepolymer component may be from an 80:20 to a 70:30 mixture of the polycarbonate prepolymer to the polyether glycol derived prepolymer.

The reaction mixture for forming the polyurethane elastomeric seal further includes a polyol additive, which polyol additive includes a polycarbonate polyol and optionally at least one other polyol. For example, the optionally at least one other polyol includes a polycarbonate polyol and/or a polyether glycol (such as PTMEG). The polyol additive may have a similar composition to that of the polyols described above with respect to forming the polycarbonate prepolymer and the polyether glycol derived prepolymer. For example, the polycarbonate polyol of the polyol additive may be the same as the polycarbonate polyol used to form the polycarbonate prepolymer (such as a 1,6-hexanediol based polycarbonate diol available from UBE Industries under the trade name ETERNACOLL). The polyol additive in the reaction mixture includes from 5 wt % to 40 wt % (e.g., 5 wt % to 35 wt %, 10 wt % to 25 wt %, 15 wt % to 20 wt %, etc.) of the polycarbonate polyol, based on the total weight of the reaction mixture. The polyol additive may account for 5 wt % to 40 wt % (e.g., 5 wt % to 35 wt %, 10 wt % to 25 wt %, 15 wt % to 20 wt %, etc.) of the reaction mixture.

The reaction mixture for forming the polyurethane elastomeric seal also includes a diol chain extender component in addition to the urethane prepolymer component and the polyol additive. The diol component includes one or more different diols. The diol component is present in the reaction mixture in an amount from 5 wt % to 20 wt % (e.g., 5 wt % to 15 wt %, 7 wt % to 10 wt %, etc.), based on the total weight of the reaction mixture. Exemplary diols for the diol chain extender include 1,3-propanediol, 1,4-butanediol, 1,5-pentanediol, 1,6-hexandiol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl)ether, short-chain C2, C3 or C4 polyether diols having a number average molecular weight of less than 700 g/mol, combinations thereof, and isomers thereof. The reaction mixture for forming the polyurethane elastomeric seal may optionally include a triol component, e.g., that increases cross linking. For example, the triol component may be present in the reaction mixture in an amount from 0.01 wt % to 5 wt %, based on a total weight of the reaction mixture.

The reaction mixture for the polyurethane elastomeric seal also includes the curative component in addition to the urethane based prepolymer component, the polyol additive, and the diol chain extender component. The curative component includes at least one amine based curing agent that accounts for 0.01 wt % to 20 wt % (e.g., 0.01 wt % to 10 wt %, 0.01 wt % to 4.5 wt %, 0.05 wt % to 3 wt %, 0.05 wt % to 1 wt %, etc.) of the total weight of the reaction mixture. For example the amine based curing agent may be a bifunctional organic diamine compound (such as a toluene based diamine, a phenyl based diamine, an alkyl based dianiline, a polyether based diamine, or an isophorone based diamine) or a trifunctional organic diamine compound (such as a phenyl based triamine, an alkyl based tramine, or a propylene based triamine) Exemplary amine based curing agents are available from Chemtura under the trademark Caytur. According to an exemplary embodiment, the curative component may include a dimethyl thio-toluene diamine.

The curative component may include at least one chlorinated aromatic diamine curing agent that accounts for 5 wt % to 100 wt % (e.g., 20 wt % to 90 wt %, 30 wt % to 90 wt %, 50 wt % to 95 wt %, 80 wt % to 99 wt %, 90 wt % to 100 wt %, etc.) of a total weight of the curative component. The chlorinated aromatic diamine curative agents may be, e.g., at least one selected from the group of 4-chloro-3,5-diaminobenzoic-acid isobutyl, 4-chloro-1,2-diaminobenzoic-acid isobutyl, 4-chloro-1,3-diaminobenzoic-acid isobutyl, 4-chloro-1,4-diaminobenzoic-acid isobutyl, di, tri, or tetra chlorinated 1,3- or 1,4-benzene diamine. For example, the chlorinated aromatic diamine agent is 4-chloro-3,5-diaminobenzoic-acid isobutyl.

The reaction mixture for forming the polyurethane elastomeric seal may additionally include other components such as at least one selected from the group of a silicone based additive, a chain extender, a crosslinker, a filler, a pigment, and an additive that can reduce fictional losses during operation. The silicone based additive may improve abrasion resistance without significantly diminishing the frictional properties of the polyurethane elastomeric seal. The silicon based additive includes an active H atom, e.g., may include a hydroxyl or amine functional group. The silicone based additive may be a dry, non-reactive silicone or non-reactive silicone oil.

The polyurethane elastomeric seal may be formed by, e.g., a casting process (such as a mold casting process). For example, the polyurethane elastomeric seal may be a piston seal that has a seal section that is cast-in-place and cured in contact with a piston hub. In another embodiment, the polyurethane elastomeric seal may be a piston seal that has a seal section that is casted and cured, and thereafter placed in contact with the piston hub. The piston seal may be molded to fit symmetrically about an outermost surface of the piston hub. The piston seal may be placed in contact with the piston hub with or without using a bonding agent (such as with an epoxy based adhesive layer).

The polyurethane elastomeric seal (such as a piston seal) may be formed by first preparing the polycarbonate-isocyanate prepolymer component by reacting the isocyanate component (which includes at least one isocyanate) with the polyol component (which includes at least only polycarbonate diol). Then, the polycarbonate-isocyanate prepolymer component is mixed with at least the diol chain extender component and the curative component (that includes a diamine based curative agent) to form a reaction mixture. The prepolymer component is present in the reaction mixture in an amount from 55 wt % to 90 wt % and the diol chain extender component is present in the reaction mixture in an amount from 5 wt % to 20 wt %, based on a total weight of the reaction mixture. The reaction mixture may be in a mold (e.g., the reaction mixture may be mixed and then poured into the mold, or various components that form the reaction mixture may be intermixed within the mold) so that a sealing element may be formed using the mold and the reaction mixture. Thereafter, the sealing element may be cured to form the piston seal.

The polyurethane elastomeric seal may be used in axial piston type hydraulic pumps (such as concrete pumps) as a piston seal. Axial piston type hydraulic pumps may include barrels that rotate under power from an external power source through a shaft, and each barrel includes at least one piston. Each piston may have a connecting rod that extends out of the barrel to enable the piston to push fluid as the piston travels back and forth in the barrel. A piston seal may form a ring that surrounds, e.g., completely encloses a circumference of, at least a portion of one piston so as to effectuate a sealing function around the piston. The piston may be provided with one piston seal or a plurality of adjacent piston seals.

The axial piston pumps are suitable as concrete pumps (or mud pumps) due to an ability to move large quantities of fluid under pressure. A concrete pump is used in the process of moving and placing concrete. For example, a concrete pump may be used in the manufacturing of pre-cast and tilt-up concrete panels, concrete framework, slab construction, concrete paving, or concrete spraying. The concrete pump may be mounted on a truck or placed in a trailer. Concrete pumping may occur at high pressures, e.g., at an operating pressures around 1,250 psi. In addition, concrete itself is a very abrasive and concrete material may include 0.75% to 1.00% water by weight and 99% rock, stone, sand, cement, and/or fly ash. This creates a harsh environment inside the pump and places a high demand on pistons to provide enough pressure to move the concrete material.

Accordingly, embodiments relate to a low friction piston seal that has improved abrasion resistance for use in concrete pumps and has an improved ability to withstand the operating conditions of a concrete pump (such as high temperature and high pressure). For example, the piston seal may have a Shore A hardness of at least 90 (e.g., from 90 to 100), according to ASTM D 2240, even after being exposed to hydrolytic aging for 28 days. The piston seal may have a less than 1% loss of mass after 28 days of hydrolytic aging. The piston seal may demonstrate at least 55% (e.g., at least 60%, etc.) retention of tensile strength after 28 days of hydrolytic aging, at least 65% (e.g., at least 75%, at least 80%, etc.) retention of tensile strength after 14 days of hydrolytic aging, and at least 90% (e.g., at least 95%, etc.) retention of tensile strength after 7 days of hydrolytic aging.

Unless indicated otherwise, the average molecular weight discussed herein is a number average molecular weight. Further, unless indicated otherwise, percentage values herein are based on weight percent.

EXAMPLES

The following materials are used:

| | |
|---|---|
| Butanediol | A 99% solution of 1,4-Butanediol (available from Sigma Aldrich). |
| ETERNACOLL ® UH-200 | A 1,6-hexanediol based polycarbonate diol with a number average molecular weight of approximately 2,000 g/mol (available from UBE Industries). |
| ISONATE ™ M 125 | An isocyanate of approximately 98/2 weight percent of 4,4'-2,4'-MDI, having an NCO content by weight of 33.3% (available from The Dow Chemical Company). |
| Benzoyl chloride | A 99% solution of benzoyl chloride (available from Sigma Aldrich). |
| BYK ®-A 535 | A silicone-free polymer defoamer additive (available from BYK Additives). |
| PTMEG Prepolymer | Hyperlast T140\95 formed using polytetramethylene ether glycol (PTMEG) and toluene diisocyanate (TDI) (available from The Dow Chemical Company. |
| ETHACURE ® 300 | A curing agent consisting of a mixture of mostly 3,5-dimethylthio-2,6-toluenediamine and 3,5-dimethylthio-2,4-toluenediamine (available from Albemarle Corporation). |
| ADDOLINK ® 1604 | A curing agent consisting essentially of 4-chloro-3,5-diamino benzoic-acid isobutyl (available from Rhein Chemie). |
| MBoCA | An aromatic amine of 4,4'-Methylenebis(2-Chlororaniline) (available from Sigma Aldrich). |

Firstly, the preparation of the polycarbonate-isocyanate prepolymer for use in Working Examples 1 and 2 is prepared using 61.18 wt % of ETERNACOLL® UH-200, 38.80 wt % of ISONATE™ M125, and 0.02 wt % of Benzoyl Chloride. The polycarbonate-isocyanate prepolymer is formed by allowing the ETERNACOLL® UH-200 and the ISONATE™ M125 to react for 2 hours at 80° C., in the presence of the Benzoyl Chloride. The NCO content of the resultant-isocyanate prepolymer is 10.34% (as measured according to ASTM D5155). Comparative Example 2 includes the PTMEG prepolymer that is available from The Dow Chemical Company as Hyperlast T140\95. The NCO content of the PTMEG-isocyanate prepolymer is 6.1% to 6.7%, as measured according to ASTM D5155.

Secondly, compositions for forming the polyurethane elastomeric seals are prepared. The polycarbonate-isocyanate prepolymer and the PTMEG prepolymer are placed in the oven at 70-80° C. After 1 hour, the polycarbonate-isocyanate prepolymer is mixed for 40 seconds (10 sec @ 800 rpm and 30 sec @ 2350 rpm). The curing agents are placed the oven at 70-75° C. for 30 minutes. Then, the polycarbonate-isocyanate and the PTMEG prepolymers are mixed with their respective curative components and chain extender components according to Table 1, below. The resultant mixtures are mixed for 40 seconds (10 sec @ 800 rpm and 30 sec @ 2350 rpm), and then quickly poured between two TEFLON® coated aluminum pans that are preheated to 100° C. and the contents are compression molded for 30 minutes at 100° C. under 4000 psi (27.58 MPa). After 15 minutes, the plaques are demolded and post cured in the oven for 18 hours at 100° C.

TABLE 1

|  | Working Example 1 (wt %) | Working Example 2 (wt %) | Comparative Example A (wt %) |
|---|---|---|---|
| 1,4-Butanediol | 7.1 | — | — |
| Polycarbonate Prepolymer | 76.8 | 46.2 | — |
| PTMEG Prepolymer | — | — | 83.0 |
| ETERNACOLL ® UH-200 | 15.5 | 46.7 | — |
| ETHACURE ® 300 | 0.6 | — | — |
| ADDOLINK ® 1604 | — | 7.1 | — |
| MBoCA | — | — | 17.0 |

Thirdly, the properties of the plaques of Working Examples 1 and 2, and Comparative Example A, are evaluated. In particular, Working Example 1 and Comparative Example A are evaluated for the following mechanical properties:

TABLE 2

|  | Working Example 1 | Comparative Example A |
|---|---|---|
| Tensile strength (MPa) | 41 | 42 |
| Percentage Modulus @ 100% (MPa) | 12 | 11 |
| Percentage Modulus @ 300% (MPa) | 33 | 29 |
| Percentage Elongation | 368 | 392 |
| Initial Shore A hardness | 93 | 95 |
| Shore A hardness after 14 days of hydrolytic aging | 90 | 83 |
| Shore A hardness after 28 days of hydrolytic aging | 91 | 65 |

The tensile strength, elongation, and modulus of Working Example 1 and Comparative Example A are obtained on tensile bar (dog bone shaped) samples that are punched out from the plaques, according to ASTM D412. The properties are measured using a Monsanto Tensometer from Alpha technologies. The dog bones are clamped pneumatically and pulled at a strain rate of 5 inch/min (12.7 cm/min). Shore A hardness of Working Example 1 and Comparative Example A are measured according to ASTM D2240 on the wet aged specimens. Referring to Table 2, Comparative Example A shows a decrease in Shore A hardness after 28 days of hydrolytic aging, while Working Example 1 shows a minimal change in Shore A hardness after 28 days of hydrolytic aging.

The plaques for Working Example 1 and Comparative Example A, are evaluated for mass loss comparison after aging. For mass loss, dogbones that are aged in water at 99° C. for the specified durations, are dried overnight at 70° C. and evaluated for a percentage of mass lost. Working Example 1 demonstrates an approximate mass loss of less than 0.5% after 7 days of hydrolytic aging and after 14 days of hydrolytic aging, and an approximate mass loss of 0.6% after 28 days of hydrolytic aging. Comparative Example A, demonstrates an approximate mass loss of 1.5% after 7 days of hydrolytic aging, an approximate mass loss of 2.2% after 14 days of hydrolytic aging, and an approximate mass loss of 2.9% after 28 days of hydrolytic aging.

The plaques of Working Examples 1 and 2 and Comparative Example A are evaluated for retention in tensile strength (measured as a percentage) after hydrolytic aging at 99° C. over a period of 28 days. Working Example 1 has an approximate 97% retention of tensile strength after 7 days of hydrolytic aging, an approximate 81% retention of tensile strength after 14 days of hydrolytic aging, and an approximate 62% retention of tensile strength over 28 days of hydrolytic aging. Working Example 2 has an approximate 90% retention of tensile strength after 7 days of hydrolytic aging, an approximate 67% retention of tensile strength after 14 days of hydrolytic aging, and an approximate 60% retention of tensile strength after 21 days of hydrolytic aging. Comparative Example A has an approximate 14% retention of tensile strength after 7 days of hydrolytic aging, an approximate 10% retention of tensile strength after 14 days of hydrolytic aging, and an approximate 4% retention of tensile strength over 28 days of hydrolytic aging.

Fourthly, the formulations of Working Example 1 and Comparative Example A are evaluated for gel time and demolding time. The gel time range is measured as the time between the onset of gel formation within a reaction mixture after the addition of the curative agent to the prepolymer and the onset of stringing (e.g., the start of elastomers formation). The gel time is measured as the time after the formulations in Table 1 are mixed (on a scale of 100 grams of each formulation) in a mold that the elastomer shows formation of strings when touched with a tongue depressor. The demolding time is measured as the time after the formulations in Table 1 are mixed that the cast elastomer part can be removed from the mold without deforming. Working Example 1 is measured as having a gel time from 3-4 minutes (based on a mixing time of 40 seconds at 80° C.) and a demolding time of 40-45 minutes (at 100° C.).

The invention claimed is:

1. A method for forming a piston seal of a hydraulic pump, the method comprising:
    forming a reaction mixture that includes a prepolymer component, a polyol additive, a diol component, and a curative component, wherein:
        the prepolymer component includes a polycarbonate-isocyanate prepolymer that is a reaction product of at least an isocyanate component and a polycarbonate polyol component, and the prepolymer component is present in an amount from 55 wt % to 90 wt %, based on a total weight of the reaction mixture,
        the polyol additive includes a polycarbonate polyol, which is present in an amount from 5 wt % to 40 wt %, based on the total weight of the reaction mixture,
        the diol component is present in an amount from 5 wt % to 20 wt %, based on the total weight of the reaction mixture, and
        the curative component includes a diamine based curative agent that is present in an amount from 0.01 wt % to 20 wt %, based on the total weight of the reaction mixture,
    forming a sealing element with the reaction mixture and a mold, and
    curing the sealing element to form a piston seal of a hydraulic pump.

2. The method as claimed in claim 1, wherein the polycarbonate-isocyanate prepolymer is the reaction product of a mixture in which the polycarbonate polyol component is present in an amount from 30 wt % to 80 wt % and the isocyanate component is present in an amount from 20 wt % to 60 wt %, based on a total weight of the mixture.

3. The method as claimed in claim 1, wherein the polycarbonate polyol component includes a polycarbonate diol, and the polycarbonate-isocyanate prepolymer is the reaction product of a mixture in which the polycarbonate diol is present in an amount from 55 wt % to 70 wt % and the isocyanate component is present in an amount from 30 wt % to 45 wt %, based on a total weight of the mixture.

4. The method as claimed in claim 1, wherein the amount of the curative component in the reaction mixture in from 0.01 wt % to 4.5 wt %, based on the total weight of the reaction mixture.

5. The method as claimed in claim 4, wherein the curative component includes at least one selected from the group of a toluene based diamine curative agent and a chlorinated aromatic diamine curative agent.

6. The method as claimed in claim 1, wherein the isocyanate component includes at least 60 wt % of 4,4'-methylene diphenyl isocyanate and a remainder of 2,4'-methylene diphenyl isocyanate, based on a total of 100 wt % for the isocyanate component.

7. The method as claimed in claim 1, wherein after the sealing element is cured to form the piston seal of the hydraulic pump, the piston seal is attached to a piston of the hydraulic pump.

8. The method as claimed in claim 1, wherein the sealing layer is formed on a piston of the hydraulic pump and the sealing layer is cured in place on the piston.

9. The method as claimed in claim 1, wherein the hydraulic pump is a concrete pump.

10. A hydraulic pump that includes a piston seal formed according to the method claimed in claim 1.

* * * * *